(12) United States Patent
Kotranza et al.

(10) Patent No.: US 9,754,512 B2
(45) Date of Patent: *Sep. 5, 2017

(54) REAL-TIME FEEDBACK OF TASK PERFORMANCE

(75) Inventors: Aaron Andrew Kotranza, Gainesville, FL (US); Benjamin Chak Lum Lok, Gainesville, FL (US); David Scott Lind, Martinez, GA (US)

(73) Assignees: University of Florida Research Foundation, Inc., Gainesville, FL (US); Augusta University Research Institute, Inc., Augusta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/499,161

(22) PCT Filed: Sep. 27, 2010

(86) PCT No.: PCT/US2010/050393
§ 371 (c)(1),
(2), (4) Date: May 2, 2012

(87) PCT Pub. No.: WO2011/041262
PCT Pub. Date: Apr. 7, 2011

(65) Prior Publication Data
US 2012/0225413 A1    Sep. 6, 2012

Related U.S. Application Data

(60) Provisional application No. 61/247,138, filed on Sep. 30, 2009.

(51) Int. Cl.
*G09B 23/28* (2006.01)
*G09B 23/30* (2006.01)

(52) U.S. Cl.
CPC ........... *G09B 23/285* (2013.01); *G09B 23/30* (2013.01)

(58) Field of Classification Search
CPC ...................................................... G09B 23/28
(Continued)

(56) References Cited

U.S. PATENT DOCUMENTS

| 4,375,674 A | 3/1983 | Thornton |
| 5,388,990 A | 2/1995 | Beckman |

(Continued)

FOREIGN PATENT DOCUMENTS

| KR | 2001-0065751 A | 7/2001 |
| WO | WO 2008/109798 A2 | 3/2008 |

OTHER PUBLICATIONS

International Search Report corresponding to PCT/US2010/050393, dated Jun. 27, 2011, 3 pgs.

(Continued)

*Primary Examiner* — Robert J Utama
*Assistant Examiner* — Robert P Bullington
(74) *Attorney, Agent, or Firm* — Wolf, Greenfield & Sacks, P.C.

(57) ABSTRACT

A method of providing real-time feedback of task performance includes receiving sensor data from sensors coupled to an object. The sensor data is received in response to tasks performed on the object and references positional data with respect to a location on the object at which tasks are performed. The method also includes applying the sensor data to a model of performance measurements, which reflect a standard of performance. The method further includes identifying any deviations of the sensor data from data in the model, and outputting feedback in real-time. The feedback includes indicators signaling tasks performed are correctly implemented and indicators signaling tasks performed are incorrectly implemented. Corrective indicators include measures for modifying task performance to achieve an outcome that approaches or meets the standard of performance. The (Continued)

indicators correspond to one or more locations on the object as determined by the positional data.

26 Claims, 14 Drawing Sheets

(58) Field of Classification Search
USPC .................................................. 434/247, 262
See application file for complete search history.

(56) References Cited

U.S. PATENT DOCUMENTS

| | | | |
|---|---|---|---|
| 5,727,950 | A | 3/1998 | Cook et al. |
| 5,951,301 | A | 9/1999 | Younker |
| 6,149,586 | A | 11/2000 | Elkind |
| 6,493,690 | B2 | 12/2002 | Bertrand et al. |
| 6,611,822 | B1 | 8/2003 | Beams et al. |
| 6,669,483 | B1* | 12/2003 | Leight et al. .................. 434/262 |
| 7,234,117 | B2 | 6/2007 | Zaner et al. |
| 2001/0045919 | A1 | 11/2001 | Ishikawa et al. |
| 2002/0127525 | A1* | 9/2002 | Arington et al. ............. 434/262 |
| 2002/0178002 | A1 | 11/2002 | Boguraev et al. |
| 2004/0064298 | A1 | 4/2004 | Levine |
| 2004/0100466 | A1 | 5/2004 | Deering |
| 2004/0106916 | A1* | 6/2004 | Quaid et al. .................... 606/1 |
| 2004/0121295 | A1 | 6/2004 | Stuart et al. |
| 2004/0126746 | A1* | 7/2004 | Toly ............................. 434/262 |
| 2004/0138864 | A1 | 7/2004 | Kurzweil et al. |
| 2004/0172259 | A1 | 9/2004 | Yamamoto et al. |
| 2004/0197750 | A1 | 10/2004 | Donaher et al. |
| 2005/0255434 | A1 | 11/2005 | Lok et al. |
| 2006/0166737 | A1 | 7/2006 | Bentley |
| 2006/0229755 | A1 | 10/2006 | Kuiken et al. |
| 2006/0235790 | A1 | 10/2006 | Jung et al. |
| 2007/0238085 | A1 | 10/2007 | Colvin et al. |
| 2008/0020361 | A1 | 1/2008 | Kron et al. |
| 2008/0124690 | A1 | 5/2008 | Redlich |
| 2008/0268418 | A1 | 10/2008 | Tashner et al. |
| 2008/0286735 | A1* | 11/2008 | Cusano ......................... 434/267 |
| 2009/0035740 | A1* | 2/2009 | Reed et al. ................... 434/265 |
| 2009/0068627 | A1 | 3/2009 | Toly |
| 2009/0208915 | A1* | 8/2009 | Pugh ............................. 434/267 |
| 2012/0139828 | A1 | 6/2012 | Lok et al. |

OTHER PUBLICATIONS

U.S. Appl. No. 13/148,706, filed Nov. 18, 2011, Lok et al.
International Search Report and Written Opinion dated Oct. 8, 2010 in connection with Application No. PCT/US2010/023877.
International Preliminary Report on Patentability mailed Aug. 25, 2011 in connection with PCT/US2010/023877.
Written Opinion mailed Jun. 27, 2011 in connection with PCT/US2010/050393.
International Preliminary Report on Patentability mailed Apr. 12, 2012 in connection with PCT/US2010/050393.
[No Author Listed], UF's virtual reality "patient" teaches bedside manners to medical students, Science Daily. Mar. 14, 2004:1-3.
Billinghurst et al., Collaborative Mixed Reality. Human Interface Technology Laboratory. Mixed Reality—Merging Physical World and Virtual World, Proceedings of the International Symposium on Mixed Reality (ISMR '99). Mar. 19-21, 1999, Yokohama, Japan:261-284.
Letterie, How virtual reality may enhance training in obstetrics and gynecology, American Journal of Obstetrics & Gynecology. Sep. 2002;187(3, Part 2): Supplement S37-40.
Pan et al., Virtual reality and mixed reality for virtual learning environments. Computer & Graphics. Feb. 2006;30(1):20-28.
Ward et al., Communication and information technology in medical education, The Lancet. Mar. 10, 2001;357(9258):792-796.
[No Author Listed], Monarch General Health System: Charting the Future of Nursing Education Today. Old Dominion University Nursing Magazine. 2012:14-17.

* cited by examiner

LOW PRESSURE

MEDIUM PRESSURE

HIGH PRESSURE

TOO HIGH

REAL-TIME FEEDBACK OF TASK PERFORMANCE

STATEMENT OF GOVERNMENT INTEREST

This invention was made with Government Support under IIS-0803652 awarded by the National Science Foundation. The Government has certain rights in the invention.

BACKGROUND

Exemplary embodiments relate generally to training of manual tasks, and more particularly, to real-time in-situ feedback of task performance relating to physical examinations.

Across fields such as mechanical, manufacturing and industrial engineering, and medicine, training of manual tasks which require learning both psychomotor (i.e., coordinating muscle movements) and cognitive (e.g., spatial layout, search) components is often accomplished by pairing the learner with an expert ("learner-expert" model). The expert observes the learner performing the task and provides the learner with feedback. Though often the standard, drawbacks of the "learner-expert" model include restricting a student's practice to times the student can be observed (conversely, placing demands on an expert's time) and the ability of experts to provide only inherently subjective feedback of varying granularity (e.g., a clinician can provide a medical student with more detailed feedback in a laparoscopic procedure than in a prostate exam, because the laparoscope allows the expert to view the student's actions within the patient's body; this is not the case for a prostate exam). To provide additional learning opportunities, mixed environments (MEs) for learning have been proposed, in which the role of the expert is assumed by visual information overlaid on the physical objects being manipulated.

MEs have the potential to benefit learning joint psychomotor-cognitive tasks. For example, MEs provide physical manipulation simultaneous with guidance for learning psychomotor and cognitive tasks. MEs may incorporate sensors (e.g., tracking) to provide automated, objective, quantitative evaluations of learner performance. Additionally, this sensor data can be processed to provide constructive, real-time feedback of performance (particularly feedback which is unavailable in a purely physical environment). Constructive feedback of learner performance is known to improve learning of cognitive, psychomotor, and joint psychomotor-cognitive tasks in physical environments. Also, MEs can integrate this automated learner evaluation and feedback in an on-demand learning environment.

Although MEs have many potential benefits for learning joint psychomotor-cognitive tasks, there are substantial challenges to realizing these benefits. The challenges to ME developers include: (1) Overcome accuracy and latency limitations of tracking in order to accurately sense the learner's psychomotor actions in real-time. Real-time sensing of learner actions is required to evaluate psychomotor task performance, and as more fine-motor skills are involved, the sensing approach required becomes more complex. In these cases, using only fiducial-based or glove-based tracking becomes less feasible due to the need to track complex hand and finger movement without encumbering this movement. (2) In real-time, extract quantitative measures of learner task performance from this noisy and possibly high-dimensional sensor data. (3) Provide real-time feedback of this performance data in a form meaningful to the learner.

Common approaches may avoid some of the pitfalls represented by these challenges, but do not fully realize all potential benefits, by: (1) Focusing on only the cognitive components of the task. These MEs provide feedback to guide cognitive tasks by presenting a priori acquired information, e.g., spatial relationships among task elements. Without providing feedback of psychomotor components, real-time sensing of learner actions is not required. However, intuitively, this reduces the ME's effectiveness in training tasks requiring psychomotor skills not already well developed in the learner. (2) Having human experts process captured performance data into post-experiential feedback. In this approach, real-time sensing of learner actions and evaluation of learner psychomotor performance is not required. However, reliance on offline expert analysis of learner performance lengthens the learning process and restricts the ability of the ME to provide on-demand learning opportunities.

MEs have successfully been applied to train joint psychomotor-cognitive tasks in which the psychomotor components are previously well developed in the learner, such as assembly tasks. MEs facilitate learning of assembly tasks by providing guidance through, e.g., a static reference diagram of the assembly or step-by-step instructions (i.e., arrows indicating where to place the next component). Although these cognitive aids reduce learners' errors and cognitive load, it has not been demonstrated that the psychomotor skills required for assembly tasks, e.g., reaching, grasping, aiming, and inserting are learned within the ME or are well developed in learners prior to training with the ME. Similar approaches to presenting cognitive aids for spatial tasks have been applied in MEs for learning printer and aircraft maintenance. MEs also aided developing cognitive models of gas flow within anesthesia machines. Similarly to the MEs for learning assembly, the psychomotor skills used were simple, e.g., pressing buttons to alter gas flow, and were not a focus of the ME.

Learning of psychomotor skills in virtual environments (VEs) and MEs has been demonstrated for two classes of tasks: tasks in which the learner uses only his or her body to interact with a virtual environment (e.g., tai chi, tennis), and tasks which focus on the interaction between a few physical objects (manipulated by the user) and a virtual environment (e.g., rehabilitation, use of forceps in birthing, laparoscopy). These systems train psychomotor tasks using the paradigm of mimicking a virtual expert (presented as pre-recorded video or a 3D reconstruction), occasionally augmented with visualization of limb trajectories. Learner performance data is captured by tracking a small number of passive props, instrumented interface devices, or is generated offline by expert review. Incorporation of real-time feedback in these systems is rare and typically replicates feedback available in the physical learning environments for these tasks, e.g., patient bleeding in laparoscopic surgery.

In order to provide real-time feedback of performance, the feedback must be a function of the learner's performance measured in real-time. This contrasts with the approach of augmenting the environment with visual elements computed from a priori measured information, e.g., as used in labeling and "x-ray" vision for navigation in outdoor environments, and assembly and maintenance learning environments. Vision-based techniques are used to augment printed images with information a priori embedded in the printed image.

What is needed is a way to provide real-time in-situ feedback of learner performance that resolves the above-described challenges while realizing the benefits of MEs for learning joint psychomotor-cognitive tasks.

SUMMARY

A method of providing real-time feedback of task performance includes receiving sensor data from sensors coupled to an object. The sensor data is received in response to tasks performed on the object and references positional data with respect to a location on the object at which tasks are performed. The method also includes applying the sensor data to a model of performance measurements, which reflect a standard of performance. The method further includes identifying any deviations of the sensor data from data in the model, and outputting feedback in real-time. The feedback includes indicators signaling tasks performed are correctly implemented and indicators signaling tasks performed are incorrectly implemented. Corrective indicators include measures for modifying task performance to achieve an outcome that approaches or meets the standard of performance. The indicators correspond to one or more locations on the object as determined by the positional data.

A system of providing real-time feedback of task performance includes a computer, sensors coupled to an object and in communication with the computer, and an output device in communication with the computer. The computer receives sensor data from the sensors. The sensor data is received in response to tasks performed on the object and references positional data with respect to a location on the object at which tasks are performed. The computer also applies the sensor data to a model of performance measurements, which reflect a standard of performance. The computer further identifies any deviations of the sensor data from data in the model, and outputs feedback in real-time. The feedback includes indicators signaling tasks performed are correctly implemented and indicators signaling tasks performed are incorrectly implemented. Corrective indicators include measures for modifying task performance to achieve an outcome that approaches or meets the standard of performance. The indicators correspond to one or more locations on the object as determined by the positional data.

BRIEF DESCRIPTION OF THE DRAWINGS

Referring now to the drawings:

FIG. 4b depicts a physical breast model that utilizes the sensors of FIG. 4a;

DETAILED DESCRIPTION

Figure 1A:
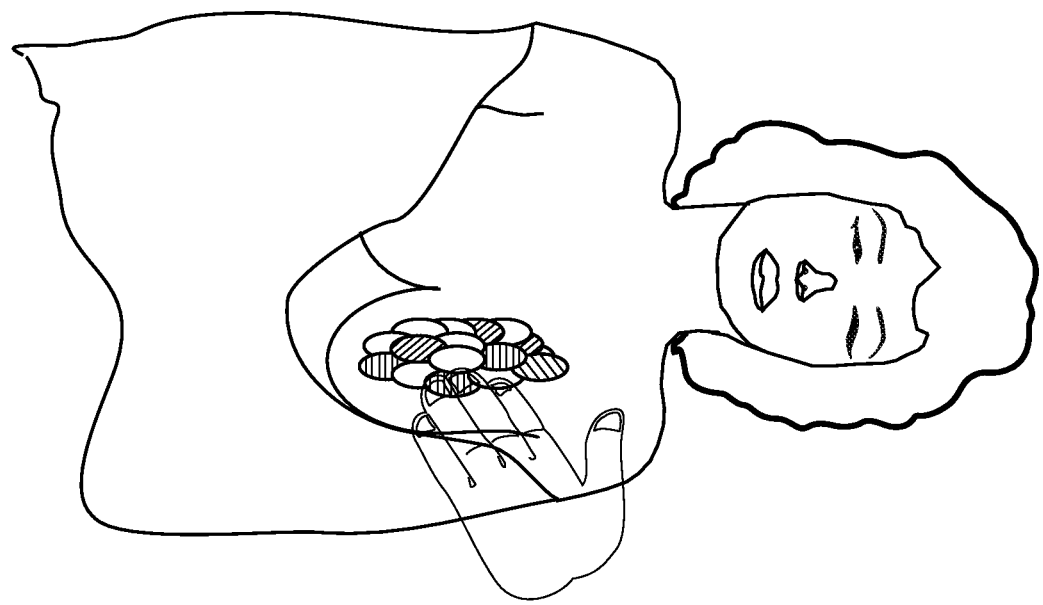
FIGS. 1a-1f depict touch maps.
Figure 1B:
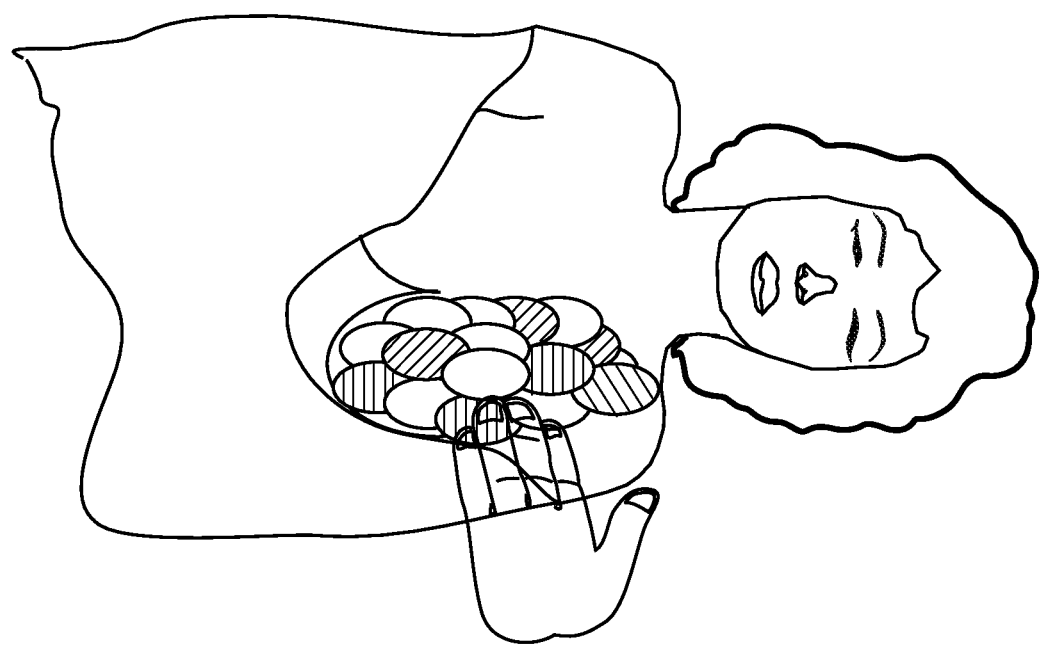
Figure 1C:
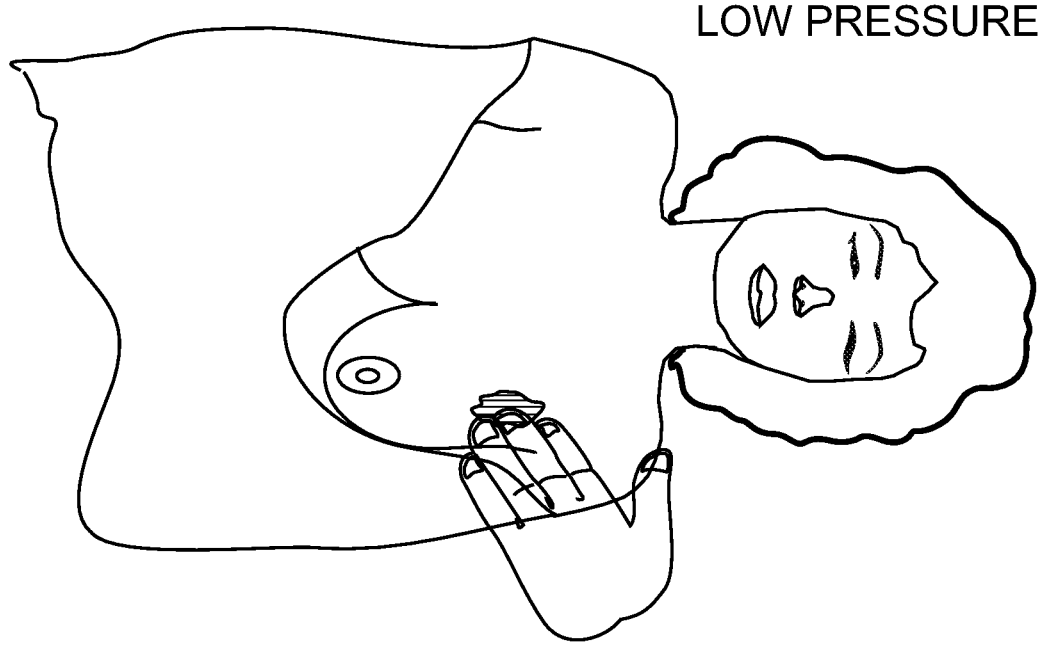

An exemplary approach to mixed environment (ME) training of manual tasks requiring learning of both psychomotor and cognitive skills is provided. To simultaneously train both skill sets, real-time generated, in-situ presented feedback of a learner's (also referred to herein as "subject") task performance provides reinforcement and correction of psychomotor skills concurrently with guidance in developing cognitive models of the task. In one exemplary embodiment, the feedback may include visual feedback of the learner's task performance, as will be described further herein. Alternatively, the feedback may be auditory.

An exemplary embodiment of the ME training includes: placing sensors in the physical environment to detect in real-time a learner's manipulation (i.e., tasks) of physical objects; inputting sensor data to models of task performance that in turn, output quantitative measures of the learner's performance; and applying pre-defined rules to transform the learner's performance data into feedback presented in real-time and in-situ with the physical objects being manipulated. The exemplary embodiments may be implemented using computer-generated, interactive virtual humans as disclosed in U.S. Provisional Application Ser. No. 60/152,300, filed Feb. 13, 2009, entitled "Communication and Skills Training Using Interactive Virtual Humans," the contents of which are herein incorporated in their entireties.

In an exemplary embodiment, the ME training is applied in an environment for learning clinical breast exams (CBEs); however, it will be understood that the ME training may be readily adapted for any applications that may benefit from joint psychomotor and cognitive training. If used in a CBE environment, the physical objects subject to the tasks include a physical simulated breast. CBEs represent a class of tasks that require learning multiple cognitive elements and task-specific psychomotor skills. Traditional approaches to learning CBEs and other joint psychomotor-cognitive tasks rely on extensive one-on-one training with an expert providing subjective feedback. By integrating real-time feedback of learners' quantitatively measured CBE performance, a mixed environment for learning CBEs provides on-demand learning opportunities with more objective, detailed feedback than available with expert observation.

Mixed environments (MEs) are proposed to be well suited to training both psychomotor and cognitive components of real-world tasks. MEs augment manipulation of physical objects with in-situ presented visual information to assist learners in becoming skilled in the psychomotor components of the task while simultaneously developing the cognitive models needed to perform the task in the real-world (i.e., without the virtual information). For example, a ME for learning a physical assembly task integrates graphical assembly instructions with the physical hardware to be assembled.

However, in evaluations of the efficacy of these MEs, emphasis is typically placed on teaching and evaluating cognitive skills, with psychomotor skills as secondary as described further herein. To teach and evaluate both psychomotor and cognitive competencies, an exemplary embodiment of the invention leverages real-time sensing of a learner's manipulation of physical objects, to provide real-time generated in-situ feedback of the learner's task performance. This feedback provides reinforcement and correction of a learner's psychomotor actions while simultaneously guiding a learner's development of cognitive models of the task. Thus, exemplary embodiments of the invention provide a method for implementing real-time in-situ visualizations of a learner's task performance in mixed learning environments, and applying the application to a ME for learning clinical breast examinations.

In an exemplary embodiment, a clinician receives feedback on his palpation pressure as he palpates a physical breast to perform a CBE on a virtual human (VH) patient, presented on an output device, such as a large screen display. The clinical breast exam (CBE) represents a class of tasks that require concurrent learning of multiple cognitive components and task-specific (i.e., new to the learner) psychomotor skills. For example, according to Bloom and Simpson's taxonomies, the CBE consists of three concurrently occurring components, which can be classified as psychomotor or cognitive: Psychomotor: 1) Palpation of the breast in circular motions with a specific motion and palpation pressure; learning the correct pressure as a guided response (trial and error) until it becomes an overt response (accurate, skillful performance). Cognitive: 2) Recall of a procedural pattern, the pattern-of-search, in which the breast should be palpated; and 3) the search task for unseen breast masses—recognizing which areas of the breast remain to be palpated in order to ensure complete coverage of the breast, and interpreting whether tissue feels like normal tissue or an abnormality. (B. S. Bloom, *Taxonomy of Educational Objectives, Handbook I: The Cognitive Domain*. New York: David McKay Co Inc, 1956. E. J. Simpson, *The Classification of Educational Objectives in the Psychomotor Domain*. Washington, D.C.: Gryphon House, 1972.)

Accepted approaches to teaching and learning CBE include lectures covering technique, practice with silicone breast models, and evaluation through expert observation of a learner's CBE of a human patient. Using these approaches, however, medical students struggle to reach competency in the psychomotor and cognitive components of the CBE. Learners struggle balancing the simultaneous psychomotor and cognitive tasks with the task of communicating with the patient. The result can include a high degree of learner anxiety and lack of confidence. Medical educators have identified a need for increased number of practice opportunities and the incorporation of standardized, immediate, objective, and detailed feedback.

In an exemplary embodiment of the invention, aforementioned difficulties in learning CBE are addressed by the creation of a ME that incorporates real-time sensing of the learner's physical actions in order to provide real-time in-situ feedback of the learner's task performance. In an exemplary embodiment, this ME is an on-demand learning experience providing learners with guidance in the psychomotor and cognitive tasks of the CBE through feedback unavailable in the traditional approach of expert observation. This approach measures learner performance objectively and quantitatively, affording feedback more fine-grained than can be provided by an expert observer. For example, without the ME's sensing of the learner's actions, it is not possible to ascertain whether the learner uses correct pressure. The expert observer cannot tell the learner how much palpation pressure to use, instead providing high level assistance such as press until you feel the chest wall. In this approach, real-time-captured sensor data affords presentation of real-time feedback indicating the correctness of the learner's palpation pressure measured to within a gram of force (see, e.g., FIG. 1 *c-f*). As provided herein, the term fine-grained refers to this detailed feedback based on quantitatively measured performance. As indicated above, this feedback may be provided as a visual representation or auditory representation of responses to the learner's tasks.

The touch map assists (FIG. 1*a*-1*b*) the cognitive task of recognizing which breast tissue remains to be palpated, (FIG. 1*c*-1*e*) reinforces use of correct pressure, and (FIG. 1*f*) indicates need for correction when too much pressure is used. To assist learners with the psychomotor and cognitive tasks of the CBE, two visualizations have been developed: the touch map (FIG. 1) provides coded reinforcement and correction of the learner's use of correct pressure (psychomotor) and guidance in recognizing when the entire breast has been palpated (cognitive). For illustrative purposes, the coding described herein is implemented as color coding; however, it will be understood that other coding techniques may be utilized in order to realize the advantages of the exemplary embodiments. The pattern-of-search map (FIG. 2) guides the learner's search strategy (cognitive) to follow that of an expert. These visualizations are viewed together (FIG. 3) to assist concurrent learning of the psychomotor and cognitive components of CBE. Face validity of this feedback to provide reinforcement, correction, and guidance in psychomotor and cognitive components of the CBE has been established through informal evaluation by expert clinicians, educators, and medical students. Expert and student feedback highlights the advantages of the ME with real-time feedback of learner performance over traditional approaches to learning CBEs. For the class of joint psychomotor-cognitive tasks including CBEs, the presented approach may enhance the applicability of MEs to training joint psychomotor-cognitive tasks.

Figure 2A:
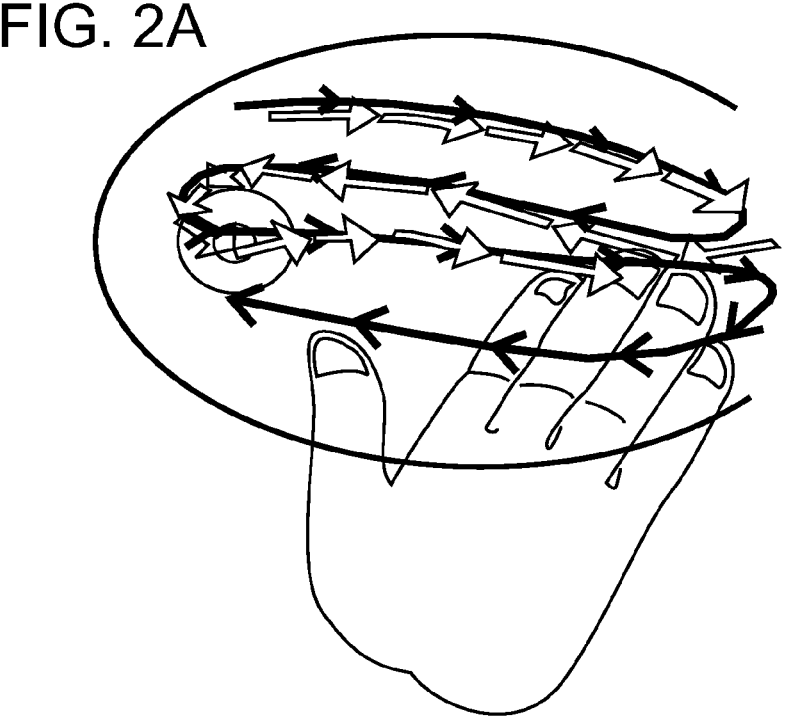
FIGS. 2a-2c depict pattern-of-search maps.
Figure 2B:
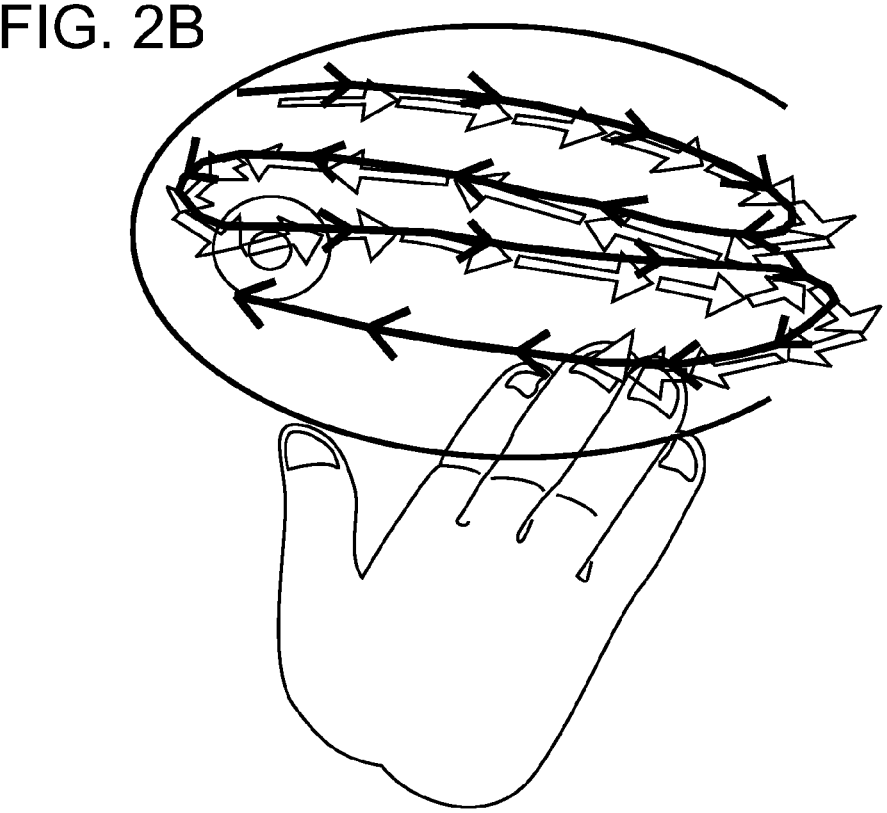
Figure 2C:
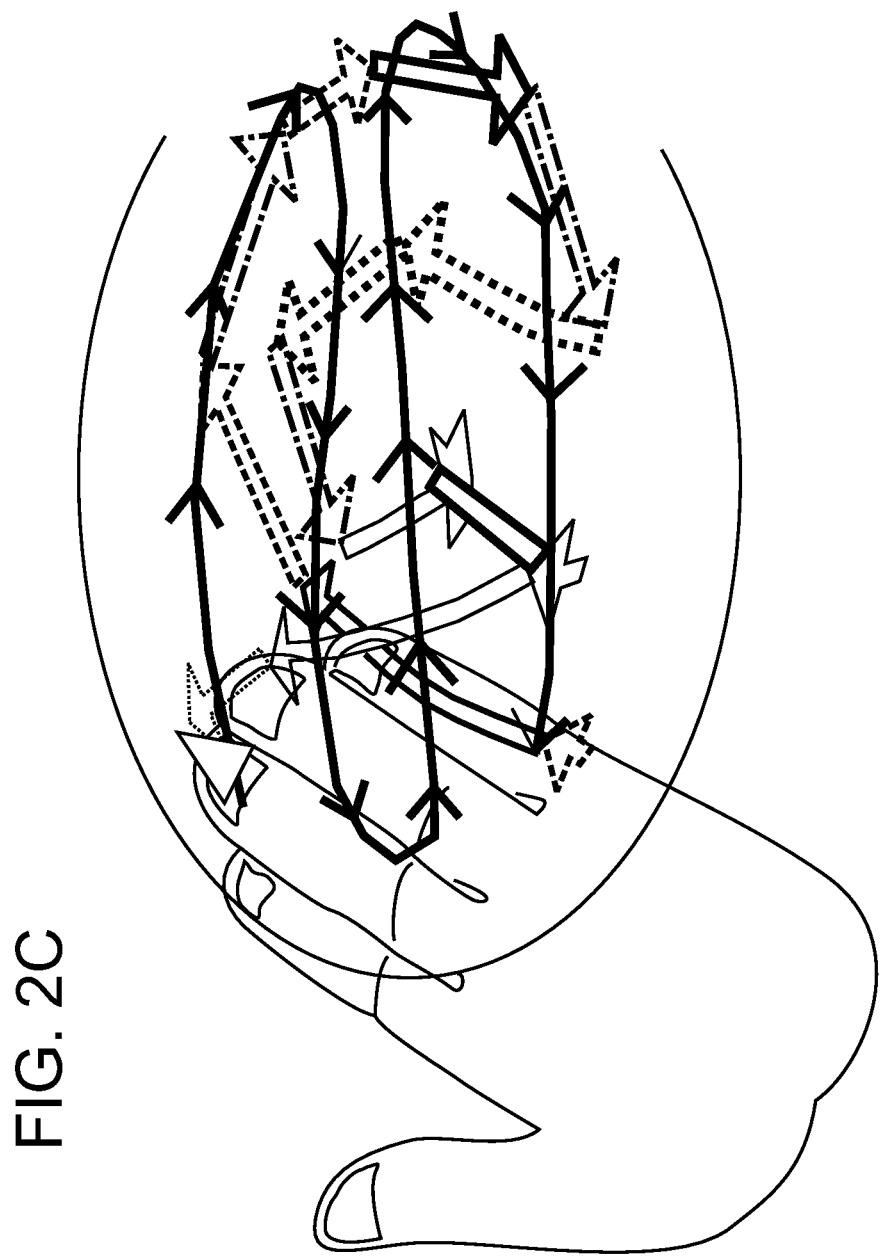
Figure 3A:
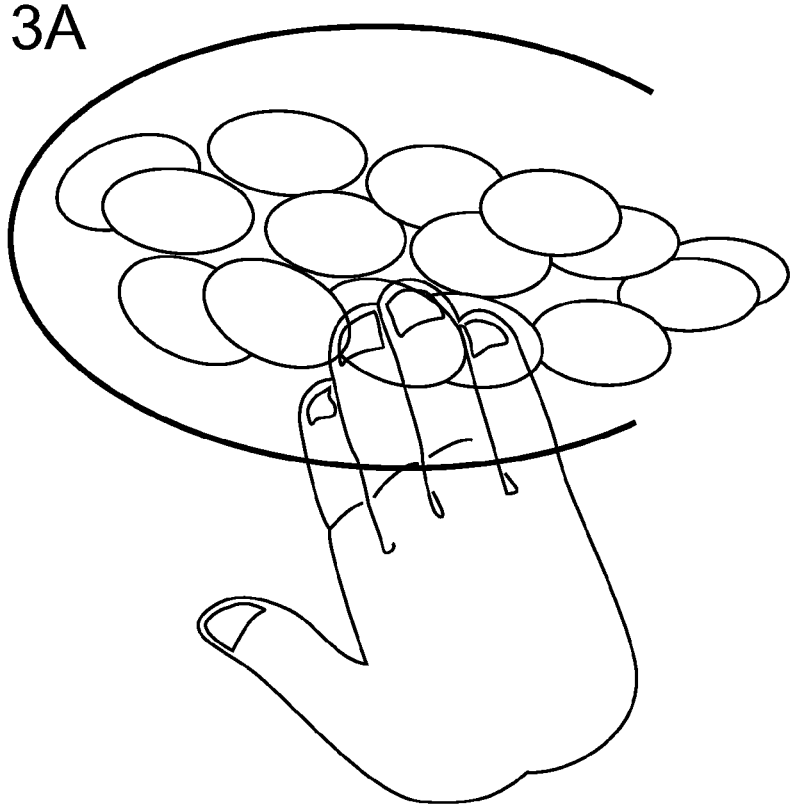
FIGS. 3a-3c depict a combination of the touch maps and pattern-of-search maps illustrated in FIGS. 1 and 2, and FIGS. 3d-3e depict a progression of the combined visualizations of FIGS. 3a-3c.
Figure 3B:
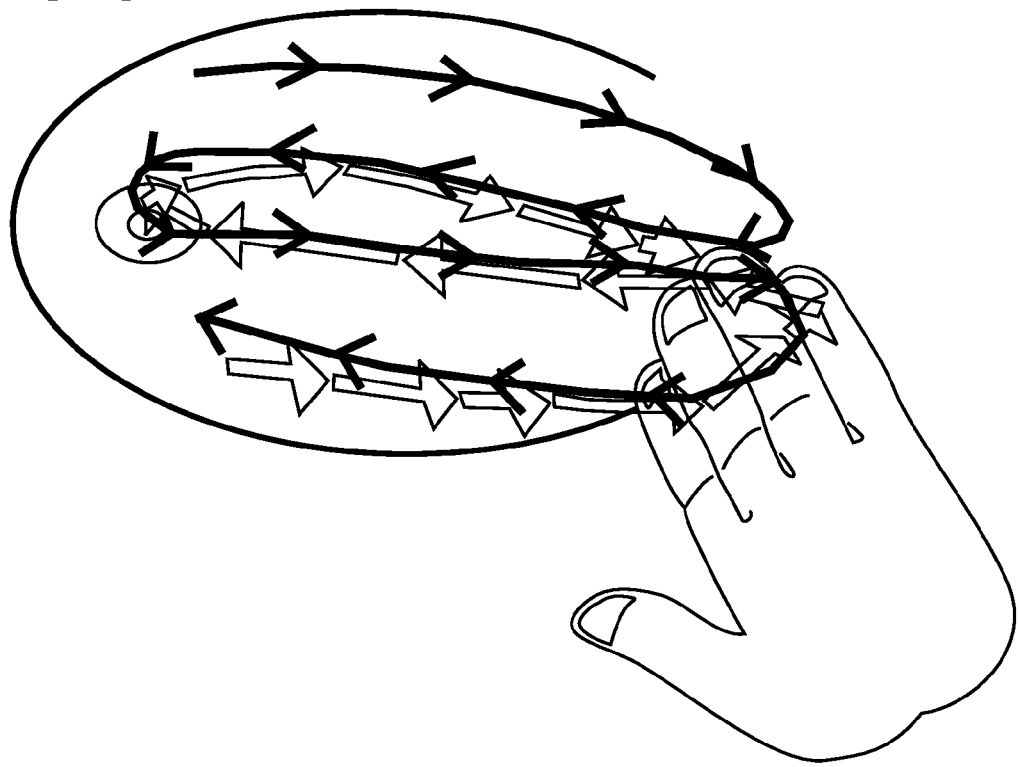
Figure 3C:
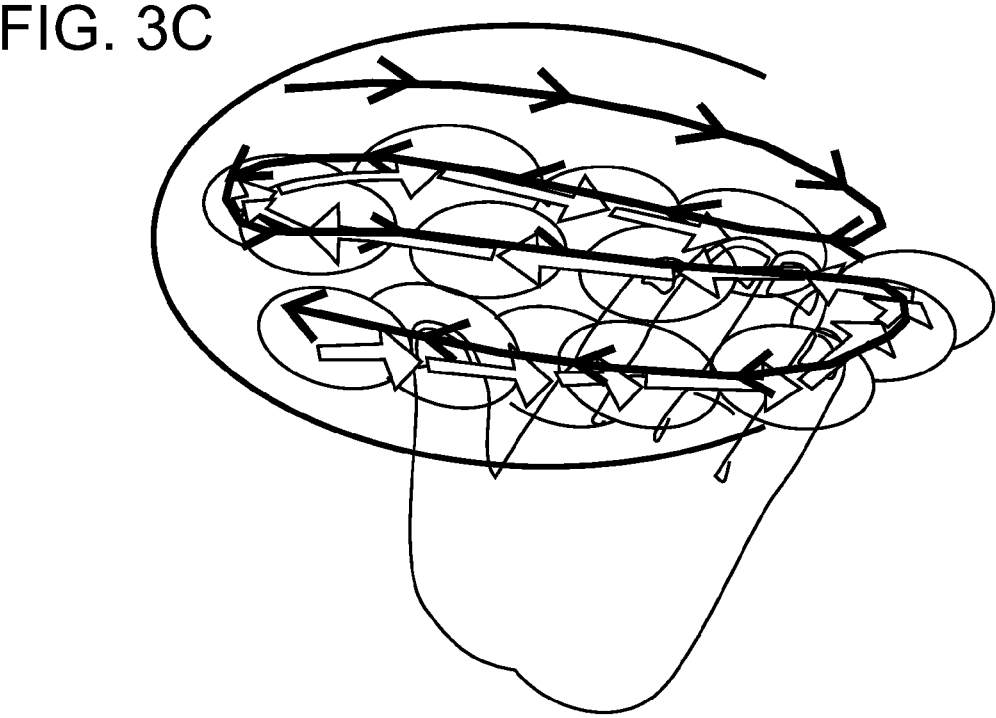
Figure 3D:
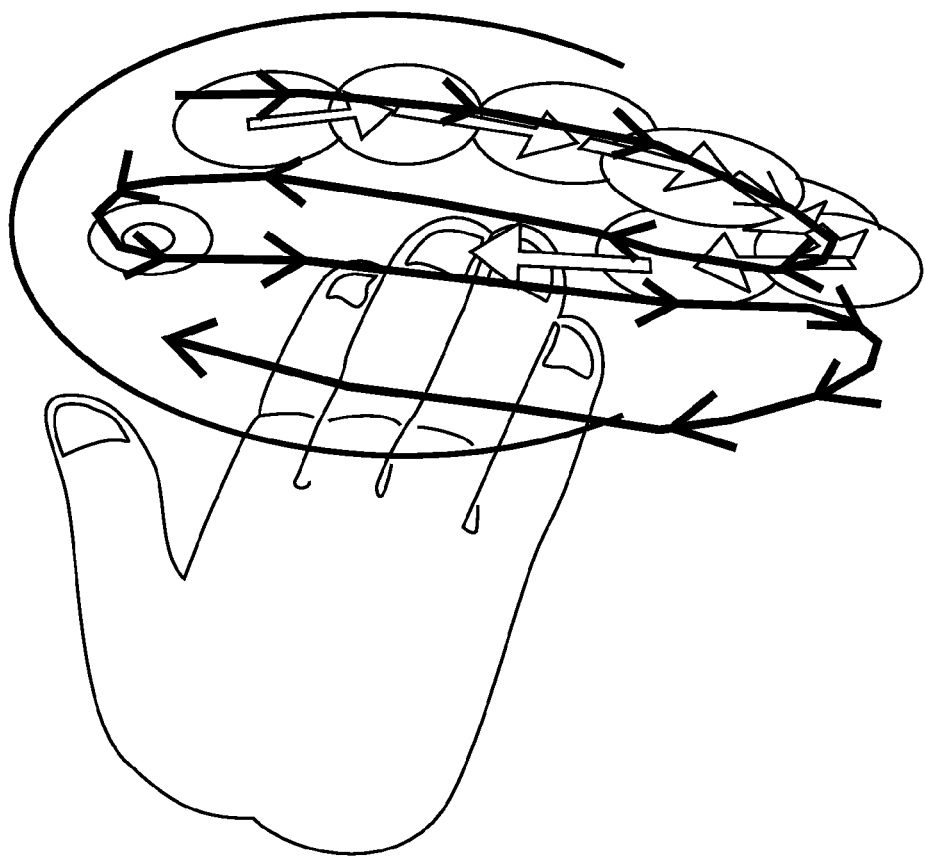
Figure 3E:
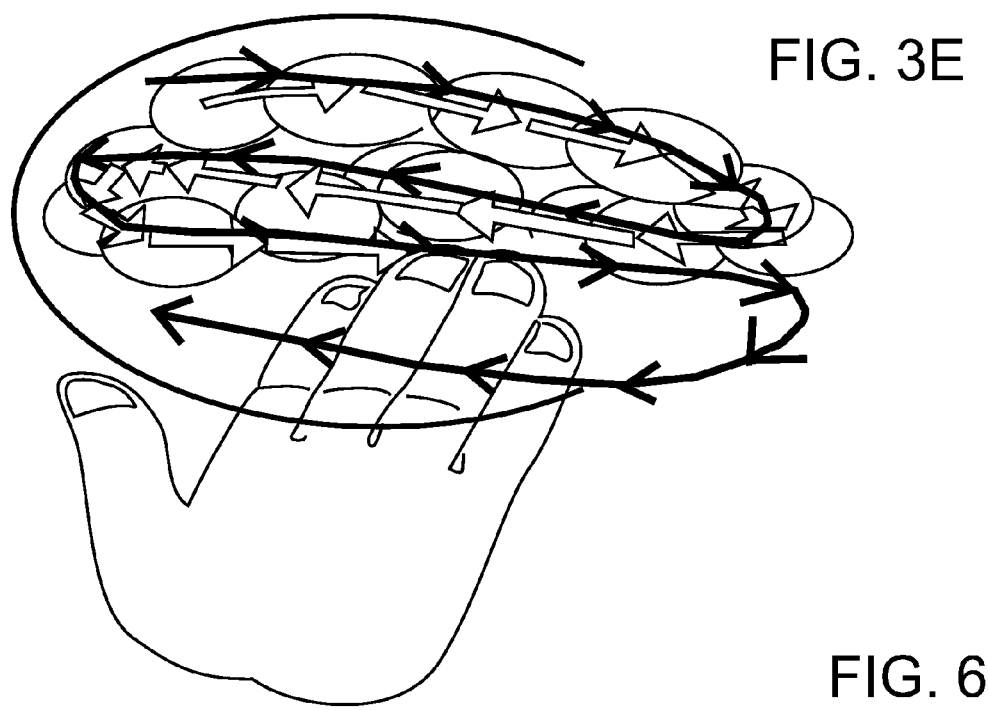
Figure 8:
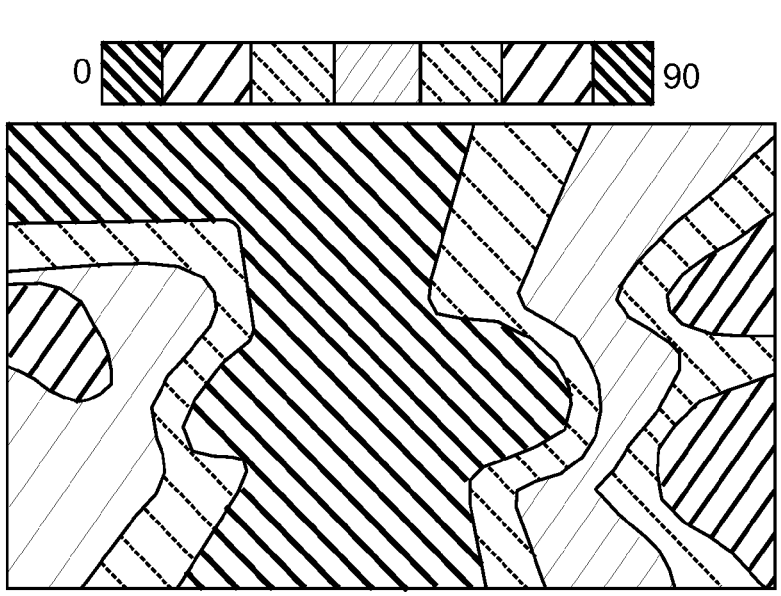
FIG. 8 depicts a video representation of output of a vertical strip pattern examination.

The pattern-of-search map (FIG. 2) assists the learner in the cognitive search task by providing the learner with an expert search pattern to follow and feedback on the learner's deviation from this pattern. A learner successfully following a vertical strip pattern (FIG. 2*a*, 2*b*; video output in FIG. 8), and not using a specific pattern (FIG. 2*c*). As shown in FIG. 3, the touch map and pattern-of-search map and combination of the two for the same exam (FIG. 3*a*-3*c*), and progression of the combined visualizations (FIGS. 3*d* and 3*e*).

Among approaches at generating feedback "on the fly" (not necessarily real-time) are augmenting a driver's view with color coded real-time-captured range data in a ME for evaluating driver awareness systems, integration of real-time captured ultrasound imagery for guiding biopsies, and the creation of visually presented Markov models for offline evaluation learners in a ME anesthesia simulator.

The exemplary approach of providing real-time feedback of learner performance for training psychomotor and cognitive components of manual tasks in MEs leverages the benefits of MEs described above, while addressing the aforementioned challenges. With respect to prior work providing feedback for learning manual tasks in MEs, the exemplary embodiments of the invention provide real-time feedback of task performance that is unavailable in purely physical learning environments and that reinforces and corrects psychomotor skills simultaneously with guiding development of cognitive models of the task.

In exemplary embodiments, a method and system for providing simultaneous learning of psychomotor and cognitive components of manual tasks in on-demand mixed learning environments are provided. Real-time generated, in-situ presented, feedback provides learners with reinforcement and correction of psychomotor skills along with guidance in building cognitive models of the task. Reinforcement and correction of psychomotor skills requires real-time sensing of the learner's actions in order to indicate to the learner when his or her actions are correct and when they are incorrect. Learning cognitive task components requires visual guidance, e.g., temporal or spatial visualization of correct performance of the task, and calculation and visualization of the learner's performance relative to correct performance.

In exemplary embodiments, multiple sensors placed on or in physical objects (e.g., simulated parts of anatomy for use in a physical examination) manipulated by the learner capture data describing the learner's actions in real-time. The type of sensors used is customized to the physical properties measured to evaluate task performance, e.g., in the ME for learning CBE, force sensors are used to measure palpation of a physical breast model. Flexibility in this sensing approach is gained by allowing sensors to be placed in an ad-hoc fashion. Limited fiducial-based tracking (e.g., 2D tracking with a single camera), primarily used in a calibration step, augments this sensing approach. In an exemplary embodiment, one color-seeing and one infrared-seeing camera are placed above the simulated anatomy. These cameras provide color and infrared video streams of the user's examination of the simulated anatomy.

In a calibration step, an expert performs an examination of the simulated anatomy. During this exam, the sensors and cameras capture data relating to qualities of the exam (e.g., for breast exam, palpation pressure, location, and time) are recorded. From the data of the expert exam, numerical models of examination performance are calculated, using, e.g., customized data mining/machine-learning algorithms.

In an exemplary embodiment, data from these sensors is fed into offline created models of expert performance. These models are created automatically from a set of sensor data captured during an expert's performance of the task in the ME. Expert performance can be considered "ideal" or "correct" performance, comparison to which allows for quantitative evaluation of the learner's performance. Given a learner's real-time sensor data, the models output quantitative, real-time measures of the learner's performance relative to an expert.

In an exemplary embodiment, pre-defined rules describing the appearance of the visual feedback (e.g., color, shape of visual elements), or alternatively, the presentation of audio feedback (e.g., remark made by the virtual human, "ouch, that hurts") are applied to the learner's quantitative performance data, creating real-time feedback of the learner's performance that is presented in-situ with the physical objects being manipulated.

During the learner's examination of the simulated anatomy, the learner views video of his/her hands examining the simulated anatomy. Overlaid on this video is real-time visual feedback of the learner's performance. To create the visual feedback elements, sensor data is input into the models of performance created above. The output of these models is quantitative data of the learner's performance relative to the expert. As indicated above, pre-defined rules governing the appearance (e.g., shape, color) of the visual feedback elements are applied to the learner performance data. Feedback elements are rendered into the video stream captured by the color-seeing camera (e.g., web camera).

This technique is applied to a ME for learning clinical breast exams (CBEs). Learners receive feedback providing reinforcement and correction of their palpation pressure as well as cognitive guidance in following a prescribed pattern-of-search and palpating the entire breast. In an exemplary embodiment, this feedback takes the form of two visualizations, a touch map which visualizes use of correct palpation pressure and the area of the breast palpated (FIG. 1), and a pattern-of-search map which visualizes use of correct pattern-of-search (FIG. 2).

The touch map provides reinforcement and correction of the psychomotor task of palpating with correct pressure. Reinforcement is provided by seeing the palpation position colored green, indicating correct pressure—associating the learner's muscle movements with the knowledge that correct pressure was applied. Correction is provided from seeing the palpation position colored red, indicating inappropriately hard pressure. The touch map also guides the cognitive task of palpating all breast tissue by coloring the breast tissue which has been palpated.

The pattern-of-search map aids in the cognitive task of recalling the correct pattern-of-search by presenting the user with an expert pattern overlaid on the breast, and visually encoding the learner's deviation of this pattern. Guidance in building cognitive models of the task is provided from both visualizations, e.g., "to find breast masses I should continue to use the amount of pressure that turns the breast green, along the pattern-of-search matching the expert's, until I have covered the entire breast." A CBE and ME developed for learning CBEs, as well as an exemplary approach applied to training CBEs will now be described in accordance with an exemplary embodiment.

Together with mammography and breast self examination, the clinical breast exam (CBE) is an essential part of screening for the early detection of breast cancer. Competence in CBE is required of all health care professionals. However, medical students and even practicing clinicians express low confidence in their CBE technique and fear they will miss a breast abnormality. Teaching and learning of CBE is often hampered by a high degree of learner anxiety, a lack of standardized, objective, fine-grained feedback, and limited opportunities for practice.

Immediate, specific, non-judgmental feedback is a highly effective motivator for sustained learning in medical education and CBE. A ME that provides a learner with real-time feedback of the learner's objectively and quantitatively measured palpation pressure, coverage of the breast, and pattern-of-search may accelerate and improve learning of this essential clinical skill.

Three main components of a CBE which may benefit from this feedback are the extent, pressure, and pattern of the examination. The extent of the examination refers to palpating all breast tissue to ensure complete "coverage" of the breast. Recognizing and recalling which areas have been palpated and which remain to be palpated is a cognitive task. The palpation pressure refers to the psychomotor task of palpating at three levels of pressure: "low," "medium," and "high," without palpating with "too-hard" pressure which would cause the patient pain. The pattern-of-search refers to a using systematic method (e.g., vertical strip or "lawn-mower pattern") of ensuring that all breast tissue is palpated. Following a prescribed pattern-of-search aids the health care provider in the cognitive task of searching for abnormalities, producing more effective exams. Recalling and following a specific pattern is a cognitive task. Prior approaches to providing automated feedback of learner performance in CBE are limited to computer-assisted physical learning environments. In these learning environments, indication of which quadrants of the breast are palpated and palpation pressure data are presented as a series of graphs and checklists, which aid experts in providing evaluation and feedback of the student's CBE; however, the feedback is not presented in-situ in a form easily interpreted by novice learners.

A mixed environment for learning CBE affords medical students additional opportunities for practicing CBEs. This "mixed reality human (MRH) patient" integrates physical interface elements (including a physical breast model) with a virtual human simulating a patient with a breast mass. The physical interface provides accurate haptic feedback and the virtual human provides the context of patient interaction which is necessary for developing the combination of interpersonal and physical exam skills required for success performing CBEs. A color webcam captures (e.g., at 640× 480, 30 Hz) a video stream of the medical student's performance of the exam (his hands and the physical breast model). This real-time video stream augments a life-sized virtual human agent presented in an immersive mixed environment. Real-time visual feedback is incorporated by rendering feedback elements into this video stream. Additional physical interface elements, e.g., a hospital gown worn by the MRH patient, are tracked by an infrared-seeing webcam, mounted alongside the color webcam. The transform of a pixel in the infrared webcam to the corresponding pixel in the color webcam is known. Sensors placed on the physical interface elements record the force of the student's palpation (referred to as palpation pressure), allowing the virtual human to respond to the student's touch, and allowing the student's performance to be assessed objectively and quantitatively.

Medical students performing a CBE of a mixed reality human (MRH) patient displayed similar interpersonal and clinical skills performance as students performing a CBE on a standardized human patient (a trained actor), the gold-standard for practice and evaluation of CBEs. This demonstrates the usability of MRH for practice and evaluation of CBE. Post-experiential visual feedback of a student's coverage and interpersonal skills with the MRH has been shown to result in short-term improvement in these skills in a subsequent CBE of a MRH.

By incorporating real-time in-situ visual feedback of the correctness of a learner's palpation pressure, pattern-of-search, and coverage, the ME of the MRH patient will provide medical students with more objective and finer-grained feedback than expert observation, more opportunities for practice, and a shorter learning cycle (i.e., CBE-evaluation-feedback-repeat). Practice of CBEs with the MRH is expected to result in long term improvement of students' CBEs with human patients.

The exemplary embodiments of ME training described herein provide real-time in-situ visual feedback of the clinical breast exam learner's use of correct palpation pressure, coverage, and use of correct pattern-of-search. In an offline step, a model of expert palpation pressure and pattern-of-search is created by capturing an expert's CBE of the MRH. During a learner's CBEs, force sensors placed in the physical interface of the MRH capture the learner's palpations in real-time. This sensor data is converted into quantitative measures of the learner's performance, relative to the expert. These measures are then converted into visual feedback of the learner's performance, presented in real-time, in-situ with the MRH patient.

Figure 4A:
FIG. 4a depicts sensors.
Figure 4B:

As shown in FIG. 4a-4b, sensors (FIG. 4a) placed under the physical breast model (FIG. 4b) detect palpation of the breast.

To provide feedback of the learner's palpation pressure, coverage, and pattern-of-search, a sensing approach is required which provides the pressure and position of each palpation of the physical breast.

To capture the palpation pressure, a set of force sensors are placed beneath the physical breast model (FIG. 4). Force sensors are placed within the environment, rather than in, e.g., a glove worn by the learner, in order to accurately simulate the conditions of the CBE (in which feeling skin texture is important) and to maintain the previously demonstrated acceptability of learning CBE in a mixed environment.

No requirements are placed on the positions of the sensors (i.e., no regular pattern is required). Each force sensor reports a scalar value representing a voltage that varies linearly with the amount of force applied. The force sensors are sampled at 35 Hz with a measured maximum delay of ~90 ms between applying force and receiving the set of 64 sensor values. There is an additional maximum 20 ms of delay until corresponding visual feedback is displayed. This delay is acceptable as CBE learners are taught that each palpation motion should have duration of 1-2 seconds.

Figure 5:
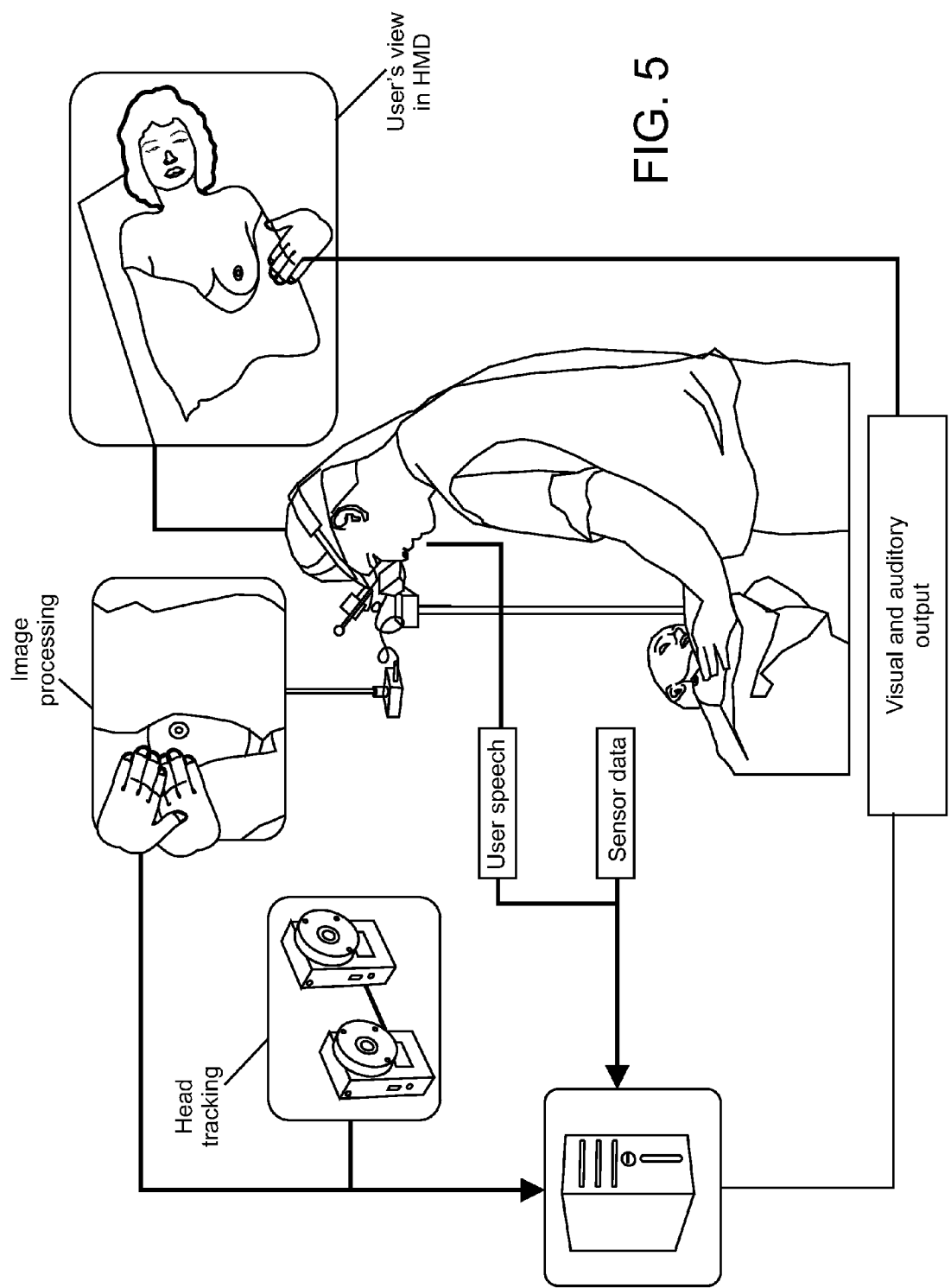
FIG. 5 depicts a diagram of a mixed reality human (MRH) system.

A computer processing device shown in FIG. 5 as a simulator, receives sensor data from the sensors, processes the sensor data (including applying the sensor data to one or more models, as well as applying rules for presenting the feedback) and outputs user performance data to an output device (e.g., head-mounted display (HMD) shown in FIG. 5). The palpation position is determined in the image space of the camera providing the video augmentation, as the visual feedback is rendered into this video stream. Palpation position in image space is approximated from the set of sensor values, with typical error of 5-15 pixels (~0.5-1.5 cm). However, in initial evaluations, palpation position was taken to be the tracked position (e.g., via a head tracking device shown in FIG. 5) of a 0.25 cm radius infrared reflective marker placed on the learner's middle fingernail (approximating the centroid of the index, middle, and ring fingers used for palpation).

The palpation position and pressure data from these sensors describes the learner's CBE performance. To transform this data into quantitative measures of the learner's performance relative to an expert, this sensor data is input into models of expert performance via the computer.

Real-time, quantitative measures of the task performance (i.e., learner's use of correct pressure and pattern-of-search) are computed from the real-time sensor data. As each set of sensor data is acquired, it is input to a model of expert task performance. This model is calculated in an offline step by processing sensor data captured during an expert's CBE of the MRH. The outputs of the model are continuous values describing the learner's current level of palpation pressure and deviation from the correct pattern-of-search.

Models of expert palpation pressure and pattern-of-search are created by capturing an expert's CBE of the MRH. In this expert calibration exam, the expert wears an infrared (IR) reflective marker covering the fingernails of the expert's index, middle, and ring fingers, the three fingers used in palpation. The infrared-seeing camera (e.g., as shown in FIG. 5) segments the pixels belonging to the infrared markers, at 30 Hz. This set of points is transformed into the coordinate frame of the color-seeing camera (which provides the video stream augmenting the MRH), resulting in the set of image-space points $X_i$. The centroid of $X_i$ is also recorded as the palpation position, $p_i$, for time step i. As each new set of force sensor values $V_i$ (values with respect to the "untouched" baseline values of each sensor) arrives at 35 Hz, the tuple ($p_i$, $X_i$, $V_i$) is recorded. The area of the IR marker representing the area of the expert's fingertips is also calculated and the radius of the inscribed circle, r, is recorded. The recorded data is processed offline to create models of correct pressure and correct pattern-of-search.

Figure 1D:
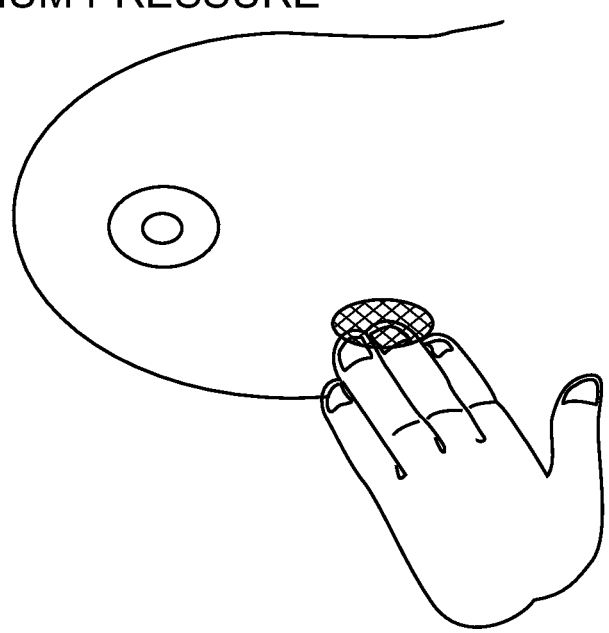
Figure 1E:
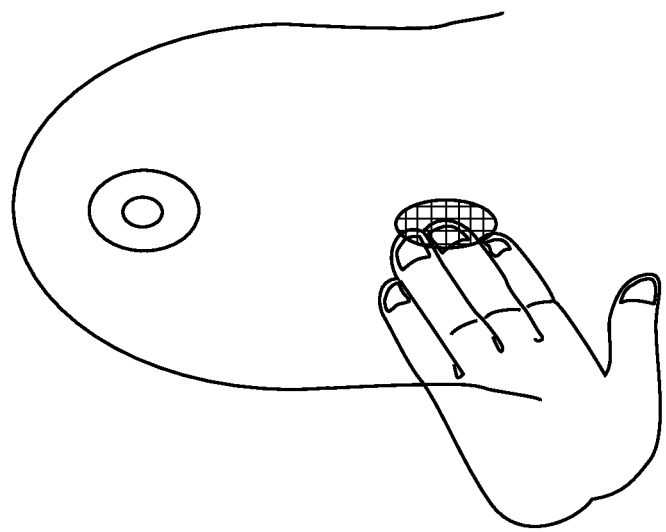
Figure 1F:
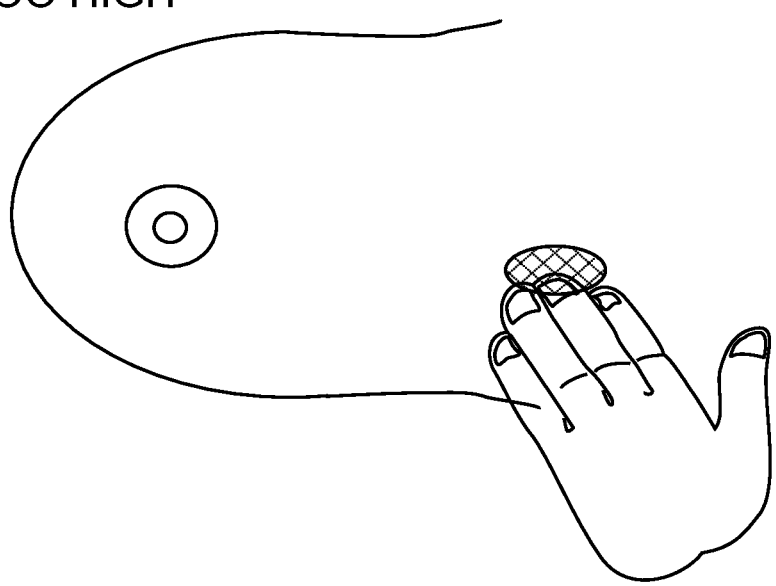

Using correct palpation pressure consists of progressing through three distinct levels of pressure: low (superficial), medium, and high (pressing to the chest wall); pressure that would cause pain ("too-high") should not be used. Thus, a level of pressure that is not acceptable (e.g., low, high, too-high) may be reflected in the performance output with a corrective indicator that corresponds to the particular level of pressure applied (e.g., in the form of text: 'low,' 'high,' 'too-high' as shown in FIGS. 1d-1f; or a color-coded element, shape or other visual representation). Likewise, a level of pressure that is acceptable (e.g., medium) may be reflected in the performance output with a positive indicator that corresponds to the particular level of pressure applied (e.g., a color-coded element, shape or other visual representation as shown in FIGS. 1d-1f).

The model of correct pressure consists of determining the range of sensor values corresponding to the low, medium, high, and too-high pressure levels at each possible palpation position. Because of the high dimensionality of the sensor data (e.g., 64 real values, one from each sensor) and the large size of the space of possible palpation positions (order of $10^5$ in the 640×480 image), the pressure ranges at each sensor are instead modeled. During the learner's exam, the pressure level is calculated at each sensor, and then the pressure level at the palpation position is calculated as a weighted average of the pressure levels at the sensors.

Modeling pressure ranges at each sensor avoids the computational expense of working with high dimensional sensor data. At each sensor, a pressure level can be modeled in one dimension—if pressure levels were modeled at each palpation position, one dimension per sensor would be used.

The low, medium, and high pressure ranges are naturally present in the sensor data of the expert's exam. Calculating these ranges is an unsupervised learning problem which can be solved using clustering. For each sensor, initial estimates of the clusters $C_k$ corresponding to low, medium, and high pressure ranges are calculated using k-means (k=3) applied to the non-zero values reported by the sensor.

$$C_k = \{X_k, \mu_k | \arg\min_x \|x - \mu k\|_2 = k\} \quad (1)$$

With k ∈ {low, medium, high}, $X_k$ the set of image-space points belonging to cluster $C_k$, and $\vec{\mu}_k$ the mean of $X_k$.

The estimated clusters for sensor s serve as initial values for an expectation-maximization algorithm fitting a Gaussian Mixture Model (GMM) to the sensor's non-zero data. The resulting GMM contains three one-dimensional Gaussian distributions corresponding to the naturally present low, medium, and high pressure ranges. The too-high pressure range is then modeled as an additional one-dimensional Gaussian component, which is a shifted (by an experimentally chosen +2.5 std. deviations) duplicate of the high pressure component. Each distribution takes the form $N_{GMM,k}(v_s|\mu_k, \sigma_k^2)$, k ∈ {low, medium, high, too-high}.

Given the palpation pressure ranges at each sensor, the palpation pressure at the learner's palpation position is calculated. This involves knowledge of how palpating at each position on the breast affects the value of each sensor. Intuitively, the value reported by sensor s increases as the palpation position approaches the position of sensor s. This relation between the palpation position and the pressure at sensor s is modeled as a 2D Gaussian centered at the position of sensor s in image-space.

The mean of the 2D Gaussian distribution $N_{2,s}(\vec{x}_{img}|\vec{\mu}_{2,s}, \Sigma_{2,s})$ of sensor s is calculated as the weighted mean of expert palpation positions corresponding to non-zero values of sensor s. The values of sensor s serve as the weights in this calculation.

To reduce the impact of noise in the sensor data, this calculation includes only those palpation positions corresponding to values of sensor s that are one standard deviation greater than the mean value reported by sensor s during the expert exam. Letting $X_{s,VALID}$ be the set of these positions and $V_{s,VALID}$ be the set of corresponding values of sensor s, the mean is calculated by Equation 2.

This adaptive thresholding heuristic calculates the sensor's position in image-space to within the radius of the sensing element, resulting in ~5 pixels (<0.5 cm) of error (to reduce this error, a smaller sensing element could be used). The covariance of the 2D Gaussian is calculated as the weighted covariance, again with the sensor's values as weights. Thresholding is not used in the covariance calculation, to preserve the notion of the covariance as the "area" of palpation positions in which the sensor reports non-zero pressure.

$$\vec{\mu}_{2,s} = \frac{\sum \vec{x} * v_s}{\sum v}, (\vec{x}, v) \in (X_{s,VALID}, V_{s,VALID}) \quad (2)$$

The model of correct pressure can be described completely by the four-component 1D GMM and 2D Gaussian at each sensor. At each simulation timestep during the learner's exam, the model is evaluated at the current set of sensor values V, and the model returns a continuous value in the range [1=low, 4=too-high] representing the learner's palpation pressure level. Given the set of sensor values V and the learner's palpation position $x_{img}$ reported by 2D infrared tracking, the learner's palpation pressure level is calculated using Equations (3) and (4).

For each sensor s with non-zero value $v_s$, calculate the pressure level $l_s$ at sensor s as:

$$l_s = \frac{\sum_k k * N_{GMM,k}(v_s | \mu_k, \sigma_k^2)}{\sum_k N_{GMM,k}(v_s | \mu_k, \sigma_k^2)} \quad (3)$$

With k ∈ {1=low, 2=medium, 3=high, 4=too high}.

The pressure level $l_{\vec{x}}$ at $\vec{x}_{img}$ is calculated as a weighted average of pressure levels at each sensor:

$$l_{\vec{x}} = \frac{\sum_s l_s * N_{2,s}(\vec{x}_{img} | \vec{\mu}_{2,s}, \Sigma_{2,s})}{\sum_s N_{2,s}(\vec{x}_{img} | \vec{\mu}_{2,s}, \Sigma_{2,s})} \quad (4)$$

Figure 6:
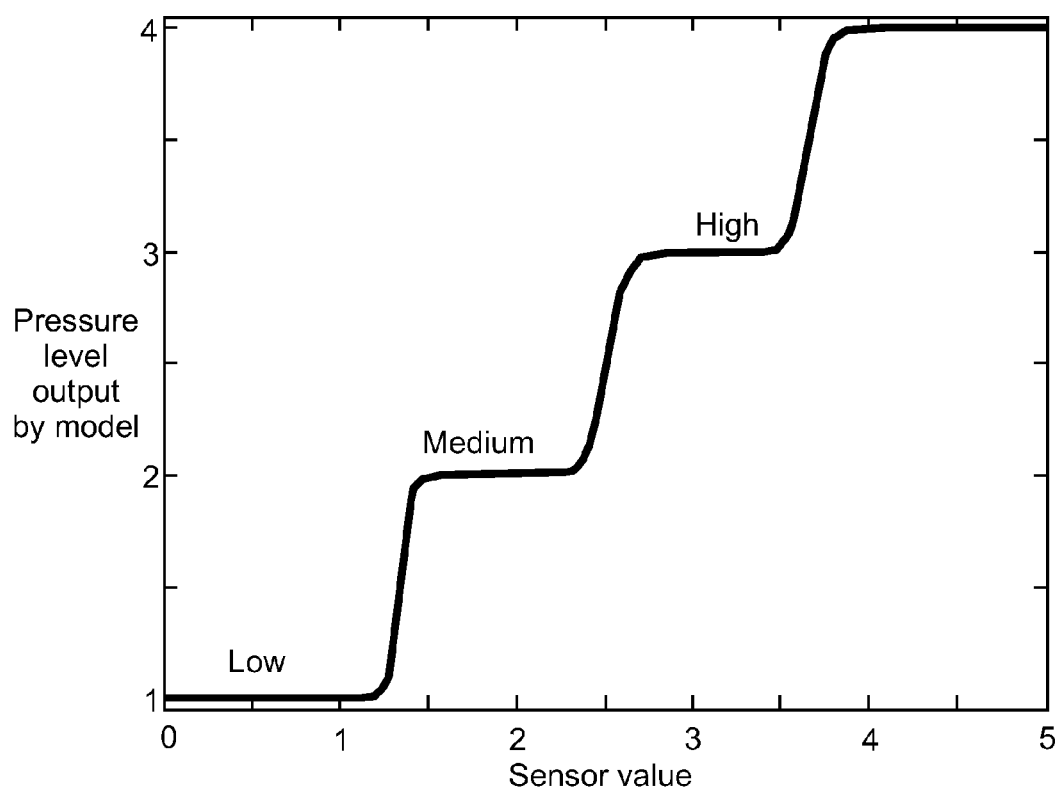
FIG. 6 is a graphical depiction of a model and sample data.

The correctness of this model is evaluated informally by demonstrating that it produces, for the range of all sensor values, output consistent with four distinct levels of pressure. It is expected that as the user reaches either of the low, medium, and high levels of pressure, there is a range of sensor values for which the pressure remains in the same level. The values of these ranges vary with the thickness of the breast tissue and can not be known a priori—these ranges are discovered by fitting of the GMM to the expert calibration data. Also, as the user transitions between levels, the output of the model should be approximately linear, as the value returned by a force sensor scales linearly with the force applied. The model reproduces this expected behavior (FIG. 6).

The presented model is computationally inexpensive (evaluation of five Gaussian distributions at each active sensor with typically no more than five sensors active at once), allowing the learner's use of correct pressure to be evaluated in real-time. The model is presented in detail as a roadmap for application designers to create real-time-evaluable models of expert performance from high dimensional data.

A model of correct pattern-of-search takes as input a recent subset of the learner's palpation positions, and outputs a quantitative measure of the learner's deviation from expert pattern-of-search. Modeling correct pattern-of-search consists of recovering the expert's pattern from the palpation position data of the expert calibration exam, and creating a real-time evaluable model to calculate the learner's deviation from this expert pattern.

Figure 7A:
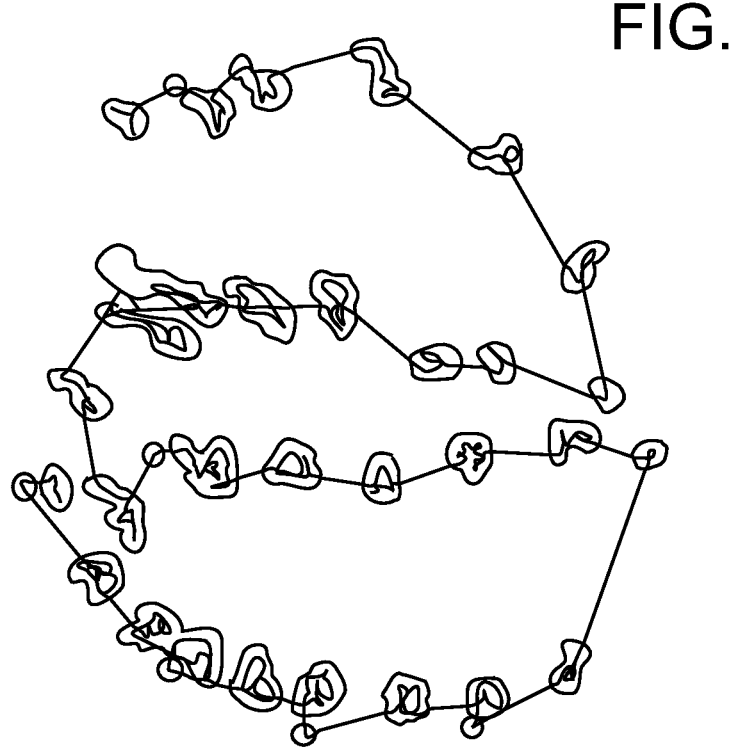
FIGS. 7a-7f depict a pattern-of-search model.
Figure 7B:
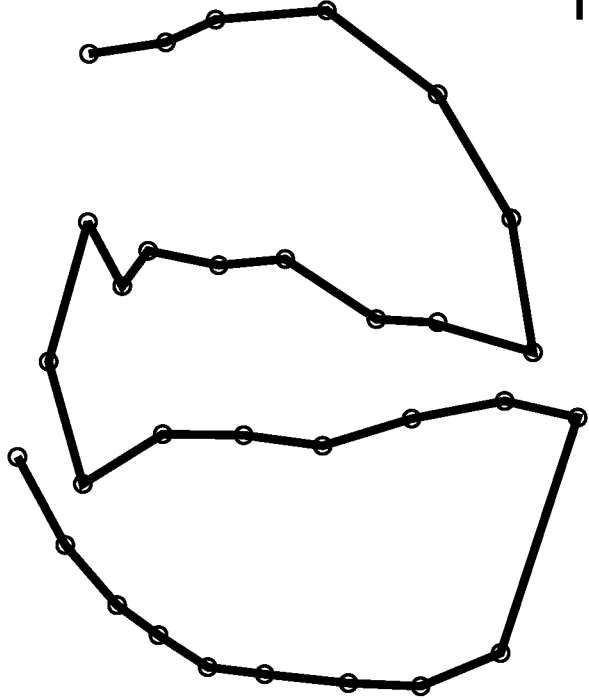
Figure 7C:
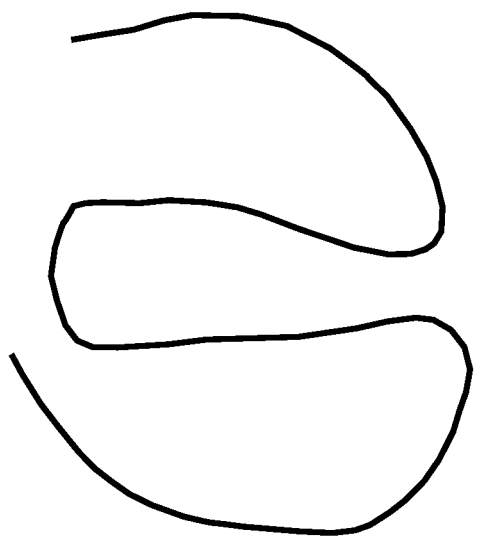
Figure 7D:
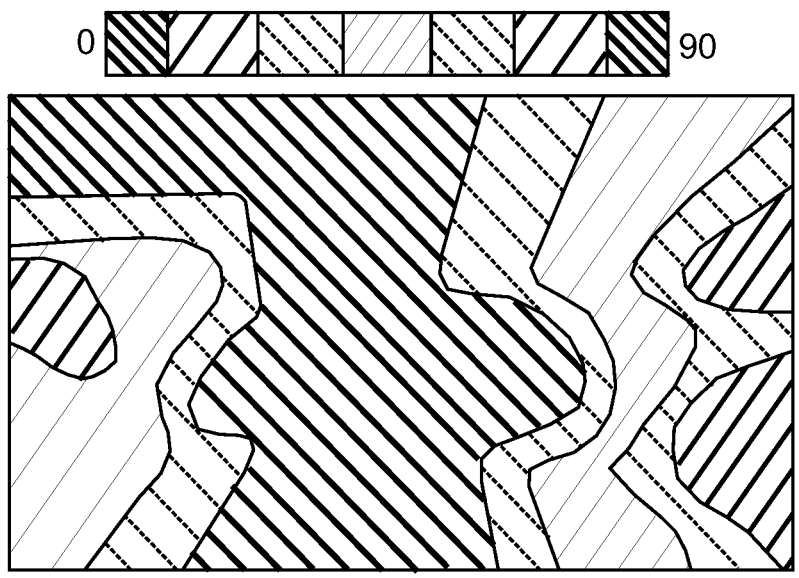
Figure 7E:
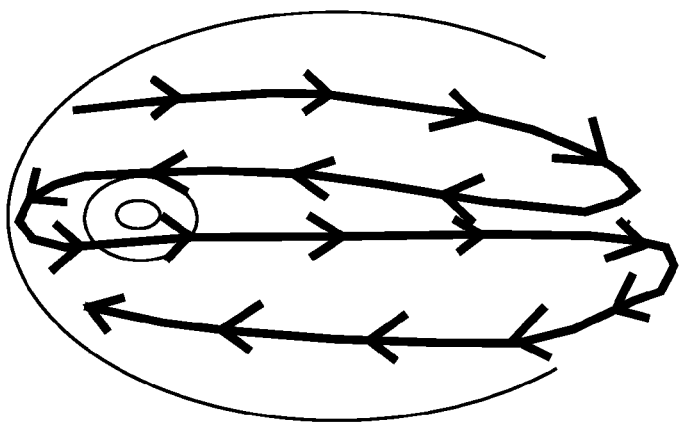

The set of palpation positions $P=\{\vec{p}_1, \ldots, \vec{p}_n\}$ captured in the expert calibration exam contains clusters corresponding to each distinct palpation. This is shown for a vertical strip pattern in FIG. 7a. The centroids of these clusters are calculated by processing P in temporal order and creating a new cluster when the distance between the current cluster's centroid and the next position $p_i$ is greater than the radius r of a circle representing the area the expert's fingertips cover in each palpation. Resulting centroids are shown in FIG. 7b. Because the noise present in the IR tracking of the expert's palpation positions influences the centroid calculation, the centroids are then filtered in temporal order by convolving with the neighborhood (¼, ½, ¼). The final expert path is created by constructing a Catmull-Rom spline with the filtered centroids as control points (FIG. 7c). The Catmull-Rom spline is employed because it passes through all control points. Direction indicators are added when rendering the expert path (FIG. 7e). The spline reconstruction of the expert pattern is stored as a sequence of line segments, S, which will be used to evaluate the learner's pattern—also represented a sequence of line segments L between the learner's successive distinct palpation positions.

Figure 7F:
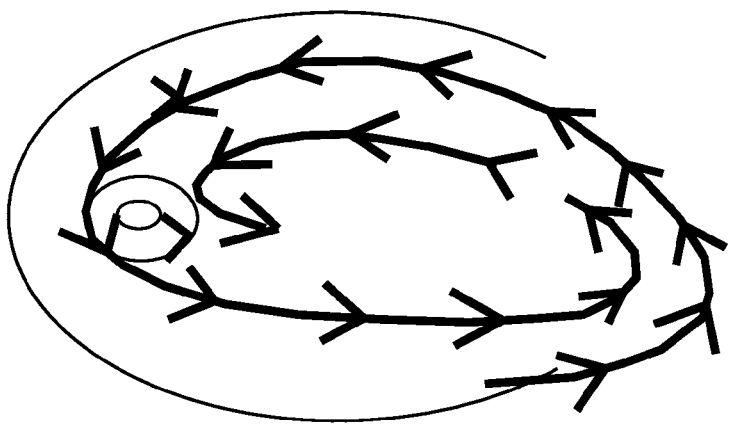

Modeling pattern-of-search: Expert palpation position data (FIG. 7a) is clustered (centroids in FIG. 7b), filtered, and interpolated (FIG. 7c), resulting in the vertical strip pattern with direction arrows added (FIG. 7e). In (FIG. 7f), the output of this process applied to a spiral pattern-of-search. In (FIG. 7d), the scalar field used to calculate learner deviation from the pattern of (FIG. 7e) is shown.

Evaluating learner pattern-of-search differs from prior approaches to evaluating learner trajectories relative to expert trajectories. In CBE, the learner's goal is to use the same pattern-of-search as the expert, but it is not necessary to follow the expert's trajectory exactly—for example, learner's should not be penalized for following the pattern in reverse temporal order or for a small translation between learner and expert patterns. Thus, Euclidean distance is a poor metric of learner deviation from the expert pattern. Deviation from the expert pattern is instead taken to be the angle between matched segments of learner and expert patterns.

An approach matching learner and expert patterns includes creating from the expert pattern a vector field which serves as a look-up-table.

In an exemplary embodiment, radial basis functions of the form $f_i(\vec{x}_{img})=\exp(-r^{-2}\|\vec{x}_{img}-\vec{m}_i\|^2)$ are placed at the midpoints of the line segments of the expert's pattern, where $m_i$ is the midpoint of segment $s_i$ and r is the radius of the circle representing the area of each palpation. Each radial basis is associated with the normalized vector of the line segment at which it is placed. The vector field value at $x_{img}$ is calculated by Equation 4. Instead of storing the vector field, a scalar field is stored to simplify computation during the learner's exam. The scalar field contains the absolute value of the dot product of $v(x_{img})$ with the reference vector (0,1). The absolute value causes forward and reverse traversal of the pattern to be equivalent. This scalar field is visualized in FIG. 7d.

$$\vec{v}(\vec{x}_{img}) = \sum_i \{f_i(\vec{x}_{img}) * \hat{s}_i\} \Big/ \sum_i f_i(\vec{x}_{img}) \qquad (4)$$

To calculate the deviation of the current line segment of the learner's pattern, the scalar field values $s(x_1)$, $s(x_2)$ at the endpoints of the segment are retrieved and the dot product d between the learner's current line segment and the reference vector calculated. The learner's deviation from the expert pattern is then calculated as the average of the differences $|d-s(x_1)|$ and $|d-s(x_2)|$. The quantitative measures of user performance output by the models of correct pressure and pattern-of-search are converted to visual feedback by applying pre-defined rules governing the appearance of the visual elements of the feedback.

To provide visual feedback of the learner's performance, pre-defined rules governing color and shape of the visual feedback are applied to the measures of learner performance. These rules define two visualizations, the touch map and the pattern-of-search map.

The touch map provides visual feedback of the learner's use of correct pressure and coverage of the breast. The touch map applies two rules to present this information visually: the coverage is encoded as visual element shape, a circle, and the pressure is encoded as the color of the visual elements, a multicolored scale with distinct colors at each of the four pressure levels.

Because each palpation consists of applying pressure using a circular motion, the shape of each visual element of the touch map is a circle. The radius of the circle is calculated during the expert calibration exam to provide a circle of approximately the area the expert's middle finger covers during the palpation motion. Each palpation of the breast results in one of these circular elements. The union of these circles represents the area of the breast tissue palpated, guiding the learner in palpating the entire breast.

The level of pressure (low, medium, high, too-high) the learner uses is represented by the color of this circle. A multicolored scale with a distinct color at each pressure level was chosen, as multicolored scales are preferred for identification tasks (i.e., identifying areas of the breast which have not been palpated with low, medium and high pressure). The colors chosen for each pressure level are influenced by prior information visualization literature and discussion with medical educators. The ability of the color scale to convey use of correct pressure is evaluated as part of the informal evaluation described further herein. As a blue-green-yellow scale best encodes continuous data, these colors are chosen for the low, medium, and high pressure levels (low=blue, medium=yellow, high=green). The order of green and yellow were swapped so that green's connotation with good would match good to reaching the high pressure level. Red was chosen for the too-high pressure level, as red connotes stop.

Given the continuous pressure level value $l_x$ outputted by the model of correct pressure, the color of the visual element is calculated by linearly interpolating between the colors at the neighboring pressure levels floor($l_x$) and floor($l_x$)+1.

The pattern-of-search map provides visual feedback of the learner's following and deviation from the expert's pattern-of-search. The rules of the pattern-of-search map are to encode the progression of the search pattern as a series of arrows, and to encode the deviation of the student's pattern from the expert's pattern as a multicolored scale.

The series of line segments that reconstruct the learner's pattern are visualized as a series of arrows which point towards increasing time. The arrows are rendered as vector graphics, with parameters of arrow tail and head widths and arrow length.

The color of each arrow represents its deviation from the expert's pattern-of-search. A three-colored scale of green, yellow, and red, as with traffic lights (go, caution, stop) are used herein. In one embodiment, green encodes that the student deviates by less than 15 degrees (low deviation range); yellow that the student deviates between 15 and 30 degrees (medium deviation range); and red encodes deviation of greater than 30 degrees (high deviation range). As with the color of the touch map elements, the color of an arrow is calculated by linearly interpolating between the two neighboring ranges of the learner's deviation value.

In one exemplary embodiment, an image-based approach is taken to locating the in-situ with the physical breast model being manipulated. In an exemplary embodiment, the visual elements of the touch map and the pattern-of-search map are rendered into the real-time video stream of the learner's hands and the physical breast, which augments the MRH patient. Fragment shaders and render-to-texture may be used to simulate an accumulation buffer for each of the touch map and pattern-of-search map. As the touch map accumulates visual elements, existing color is overwritten only by color representing higher pressure. The final color of each touch map element thus represents the highest pressure used at that position. For the pattern-of-search map, more recent elements occlude older elements. For each frame of video, the latest touch map and pattern-of-search map (in that order) are alpha blended with the video. The video frame is then projected onto the mesh of the MRH patient.

A single expert's CBE may be used to base models of expert performance. However, the validity of the models of expert performance may be increased by incorporating data from multiple experts. The model of correct palpation pressure is trivially extended by having multiple experts perform calibration exams in succession and processing the aggregate data as usual. The use of radial basis functions in calculating learner deviation from the expert path may allow the learner deviation calculation to be trivially extended to use multiple experts' data.

The elements of the visual feedback are rendered "on-top" of the video stream of the learner's hands and the physical breast model. This maximizes the visibility of the visual feedback. Additionally, the visual feedback is rendered with (learner adjustable) partial transparency. However, rendering the feedback on top of the learner's hand may make it difficult for learners to locate their fingertips in the ME. The use of adaptive-k Gaussian mixture models for segmenting the learner's hands from the video stream may be employed.

As indicated above, the exemplary embodiments of the invention provide an approach to implementing real-time in-situ visual feedback of a learner's task performance in a ME for learning joint psychomotor-cognitive tasks. This approach leverages sensing customized to the task to calculate quantitative measures of a learner's performance and applies pre-defined rules to transform these measures into visual feedback. The presented approach may be applied to create two visualizations of learner performance, the touch map and the pattern-of-search map to assist novice medical students in learning the clinical breast exam in a mixed environment. These visualizations provide visual feedback of spatial, temporal, and other measured physical data (e.g., pressure). Visual feedback of these classes of data may benefit many other applications of MEs for learning joint psychomotor-cognitive tasks, and can be generated in real-time from a user's interaction by applying the general approach described herein. Such incorporation of real-time in-situ visual feedback of learner task performance is expected to improve learning of joint psychomotor-cognitive tasks in MEs.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of providing real-time instructional information relating to task performance, comprising:
   receiving sensor data from sensors coupled to a physical object, the sensor data received at a computer in response to a task performed on the physical object by a subject, the sensor data referencing positional data with respect to a location on the physical object to which the task is performed;
   applying the sensor data to a model of performance with respect to the task;
   receiving, at the computer, video data of the subject performing the task;
   calculating at least one performance value resulting from applying the sensor data to the model; and
   outputting instructional information in real-time to the subject via at least one output device, wherein the computer derives the instructional information based on the at least one performance value and the video data such that the instructional information comprises:
   indicators signaling whether the task was performed on the physical object in accordance with the model; and
   a representation of a human exhibiting a behavior that is a response to performance of the task by the subject on the human.

2. The method of claim 1, wherein the physical object is a simulated anatomy of a patient that is being examined, and the task represents examination of the simulated anatomy by the subject.

3. The method of claim 2, wherein the examination is a clinical breast examination and the sensors are configured to measure physical qualities of the examination for which the instructional information is to be provided.

4. The method of claim 2, wherein outputting the instructional information in real-time further includes displaying a computer-generated simulated human exhibiting a human response to produce a mixed environment, wherein the mixed environment includes at least the physical object and the video data.

5. The method of claim 4, further comprising:
receiving sensor data for the task performed on the physical object by another subject, the sensor data reflecting qualities of the task performed by the other subject; and
calculating numerical models of examination performance by the other subject to produce a standard of performance.

6. The method of claim 1, wherein outputting the instructional information in real-time includes:
displaying, for the subject via the output device, a video representation of the task performed by the subject with respect to the physical object; and
overlaying, on the video representation, real-time in-situ feedback of the task performed by the subject.

7. The method of claim 6, wherein the positional data further comprises location data with respect to a continuous sequence of tasks forming a pattern, and wherein applying the sensor data to the model includes:
applying the pattern of the positional data to a pattern of positional data in the model, and calculating quantitative performance values that include any deviations resulting from the applying the pattern of the positional data to the model, the deviations identified as an angle between matched segments of the patterns of positional data for the respective subject and model;
wherein overlaying the real-time in-situ instructional information includes simultaneously displaying a pattern of search map created by the model overlaid by a pattern of search map representing the continuous sequence of tasks forming the pattern.

8. The method of claim 7, wherein the indicators signaling whether the task was performed on the physical object in accordance with the model comprise displaying a color pattern on the physical object, with different colors depicting conformance and non-conformance to the model.

9. The method of claim 1, wherein the sensors are force sensors and the receiving sensor data further includes receiving voltage values representing pressure applied on the physical object by the subject, the method further comprising:
applying the voltage values to the model; and
identifying any deviations of the sensor data specifying the voltage values from data in the model.

10. The method of claim 9, wherein outputting the instructional information in real-time includes:
displaying, for the subject via the output device, a video representation of the task performed by the subject with respect to the physical object; and
overlaying, on the video representation, real-time in-situ instructional information of the task performed by the subject;
wherein the real-time in-situ instructional information of the task includes displaying a sequence of visually-distinct elements representing the pressure data, the positional data, and a coverage area specifying physical locations of the object in which the task has been performed.

11. A system for providing real-time instructional information relating to task performance, the system comprising:
a computer;
sensors coupled to a physical object and in communication with the computer, wherein the physical object comprises, at least in part a simulated human anatomy; and
an output device in communication with the computer, wherein the computer is configured to implement a method comprising:
receiving sensor data from the sensors, the sensor data received in response to a task performed on the physical object by a subject, the sensor data referencing positional data with respect to a location on the physical object to which the task is performed;
determining based on the sensor data an indication of performance of the task by comparing the sensor data to a model of performance;
determining, based on the indication of performance, at least one of an audio feedback element and a visual feedback element that is a representation of a human exhibiting a behavior responding to the task being performed on the human; and
outputting, to the subject via the output device in real-time during performance of the task by the subject on the physical object, the representation of the human.

12. The system of claim 11, wherein the task represents a medical examination of the simulated anatomy by the subject.

13. The system of claim 12, wherein the examination is a clinical breast examination and the sensors are configured to measure physical qualities of the examination, and the computer is further configured to provide feedback related to appropriateness of pressure provided during the clinical breast examination.

14. The system of claim 11, further comprising a camera, wherein outputting the representation of the human in real-time further includes outputting a video stream with a computer-generated simulated extension of the simulated human anatomy to produce a mixed environment, the simulated extension being based at least in part on information captured with the camera.

15. The system of claim 14, wherein:
the system further comprises an object associated with the simulated human anatomy;
the computer determines the human behavior based at least in part on a position of the object determined from the information captured with the camera.

16. The system of claim 11, wherein outputting the representation of the human in real-time includes:
displaying, for the subject via the output device, computer-generated, interactive virtual human exhibiting behaviors selected based on the indication of performance.

17. The system of claim 16, wherein the positional data further comprises location data with respect to a continuous sequence of actions forming a pattern, and wherein determining based on the sensor data comprises applying the sensor data to a model by:
applying the pattern of the positional data to a pattern of positional data in the model, and calculating quantitative performance values that include any deviations resulting from the applying the pattern of the positional data to the model, the deviations identified as an angle between matched segments of the patterns of positional data for the respective subject and model.

18. The system of claim 17, wherein the physical object comprises indicators, and the computer is further configured to signal whether the task was performed on the physical object in accordance with the model comprise displaying with the indicators a color pattern on the physical object, with different colors depicting conformance and non-conformance to the model.

19. The system of claim 11, wherein the sensors are force sensors and the receiving sensor data further includes receiving voltage values representing pressure applied on the physical object by the subject, the method further comprising:
applying the voltage values to the model; and
identifying any deviations of the sensor data specifying the voltage values from data in the model.

20. The system of claim 19, wherein the method further comprises outputting the instructional information in real-time by:
displaying, for the subject via the output device, a video representation of the task performed by the subject with respect to the physical object; and
overlaying, on the video representation, real-time in-situ feedback of the task performed by the subject;
wherein the instructional information comprises real-time in-situ feedback comprising a sequence of visually-distinct elements representing the pressure data, the positional data, and a coverage area specifying physical locations of the object in which the task has been performed.

21. A method of providing a mixed environment for learning a medical procedure, wherein the mixed environment comprises at least one physical object representing a patient with which a subject interacts physically and at least one computer generated display visible to the subject, the method comprising:
determining physical interactions between the subject and the at least one physical object during performance of a simulated medical procedure;
with at least one computing device, assessing performance of the medical procedure by the subject based on comparing the determined physical interactions to a model of performance, and determining, based on the assessed performance of the medical procedure by the subject, at least one feedback element representing behavior of a human in response to the physical interactions; and
concurrently rendering to the subject:
instructional information based on the assessed performance; and
the at least one feedback element as simulated behavior of the patient during performance of the medical procedure.

22. The method of claim 21, wherein:
the method further comprises:
receiving, via a camera, video of performance of the medical procedure by the subject;
determining the physical interactions comprises measuring pressure on the physical object with pressure sensors; and
applying data from the pressure sensors and information extracted from the video to a computer model of performance of the medical procedure to determine the assessed performance; and
concurrently rendering to the subject an indication of the assessed performance and simulated behavior of a human patient during performance of the task comprises presenting a mixed learning environment with a virtual human agent to the subject.

23. The method of claim 21, further comprising:
tracking, via a camera, a marker attached to a movable object within the mixed environment.

24. The method of claim 23, wherein the movable object comprises an article of patient clothing.

25. The method of claim 21, wherein:
determining the physical interactions comprises:
measuring pressure on the physical object with pressure sensors; and
computing interpolated sensor data based on the received sensor data and at least one sensor distribution function.

26. The method of claim 21, wherein
the method further comprises generating the model of performance based on sensor data recorded during performance of the task by an expert.

* * * * *